INVENTOR.
Eric J. Opitz
BY
Barnes, Kisselle, Laughlin & Raisch
ATTORNEYS

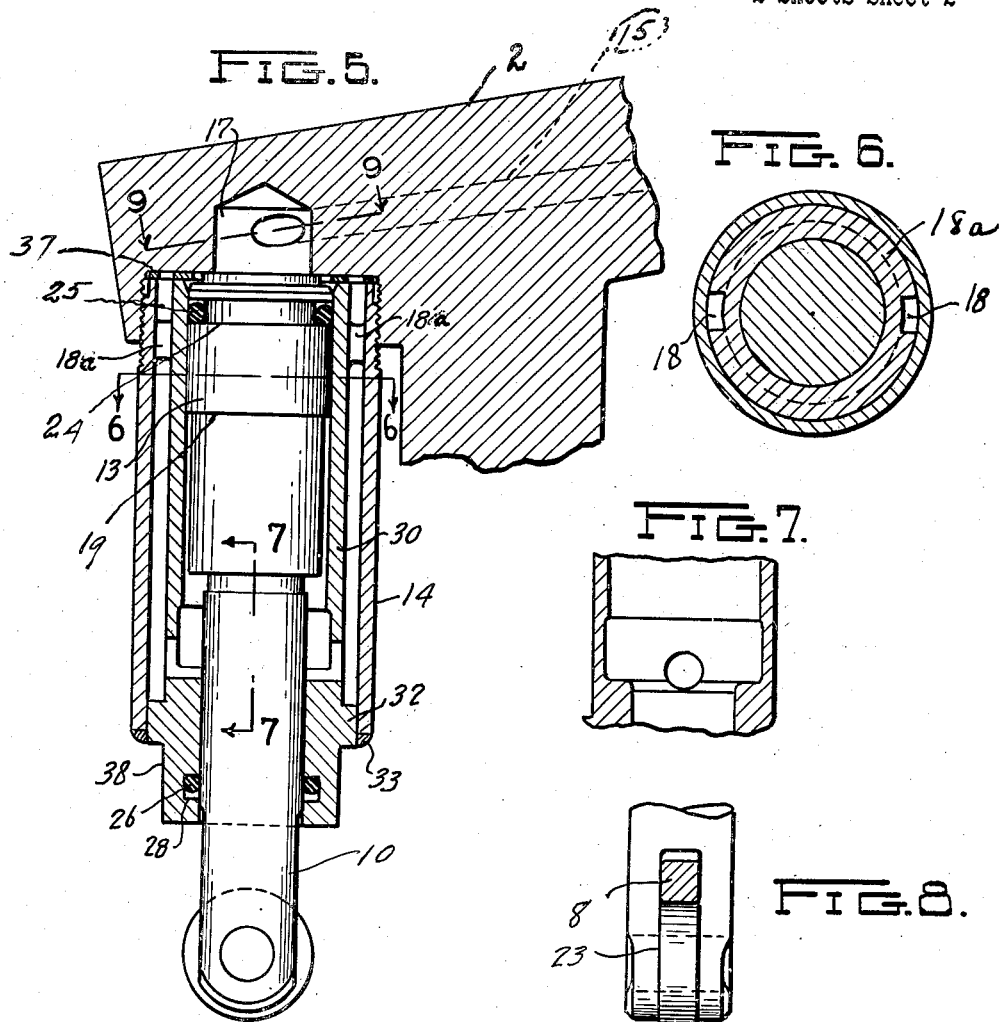

Patented Oct. 25, 1949

2,486,319

UNITED STATES PATENT OFFICE 2,486,319

APPARATUS FOR MAKING CLOSELY SPACED SPOT WELDS

Eric J. Opitz, Pleasant Ridge, Mich., assignor to General Motors Corporation, Detroit, Mich., a corporation of Delaware Application August 4, 1948, Serial No. 42,363

6 Claims. (Cl. 219—4)

This invention relates to spot welding and has for its object, welding apparatus which is designed to have a line of electrodes with a minimum spacing between the electrodes to place the spot welds as closely together as possible.

These and other features will be apparent after a full description of the invention is given.

In the drawings:

Figure 5 is a vertical section through a portion of the supporting bracket and the hydraulic cylinder.

Figure 6 is a section on the line 6—6 of Figure 5.

Figure 7 is a fragmentary section on the line 7—7 of Figure 5.

Figure 8 is a fragmentary elevation showing the end of the piston rod and the roller.

Figure 9 is a section on the line 9—9 of Figure 5.

Figure 11 is a section on the line 11—11 of Figure 9.

Figures 2, 3:
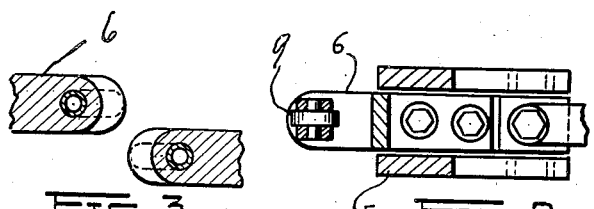
Figure 2 is a section on the line 2—2 of Figure 1.
Figure 3 is a section on the line 3—3 of Figure 1.
Figure 4:
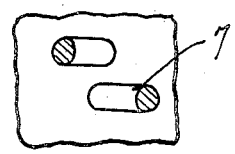
Figure 4 is a section on the line 4—4 of Figure 1.

1 designates the frame of the machine or it may be the ram of a press welder. Each of the welding units comprises a T-like bracket 2, with the head of the T bolted to the frame 1 or ram, by bolts 3. The lower end of the stem of the T is bent outwardly. A journal 4, is carried by the lower end of the T bracket in an insulating sleeve 40. This T stem is bifurcated at 5 and the bifurcated portions straddle a rock arm 6 (see Figure 2) which is supported to swing on the journal 4. This rock arm supports the electrode 7. It is insulated from the hydraulic cylinder and its connected parts by insulation 20. The secondary cables are designated 21 and the water pipes 22. These latter furnish the cooling medium.

The top of the rock arm carries a bent arm 8 which is arranged to engage over the roll 9 carried on the lower end of the piston rod 10. The lower end of the piston rod is bifurcated at 23 as shown in Figure 8 so as to straddle this bent arm 8 and roll 9. The roll 9 can travel on the track 11 bolted through insulation sleeves 50 to the electrode supporting arm 6. The electrode supporting arm 6 is relatively narrow (see Figure 2) so that it occupies much less space than does the hydraulic cylinder. The cylinder is tipped away from the vertical center line through the point 12 where the spot weld is made. The cylinders 14 are placed in staggered relation opposite one another on opposite sides of the vertical plane coinciding with the line of welds. These cylinders will have portions overlapping each other on opposite sides of the vertical plane.

Figure 10:
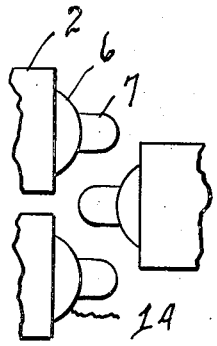
Figure 10 is a plan view showing the spacing of the electrodes.

Figure 10 shows how the cylinders are staggered and overlapped and how by reason of this arrangement the electrodes can be spaced a minimum of 1⅛ inches. If narrower hydraulic cylinders are used, the spacing can be even less. This makes it possible to get the welds very close together and obviates the necessity of passing the work a second time through a welding machine or passing it through another welder where closely spaced spot welds are required.

Figure 1:
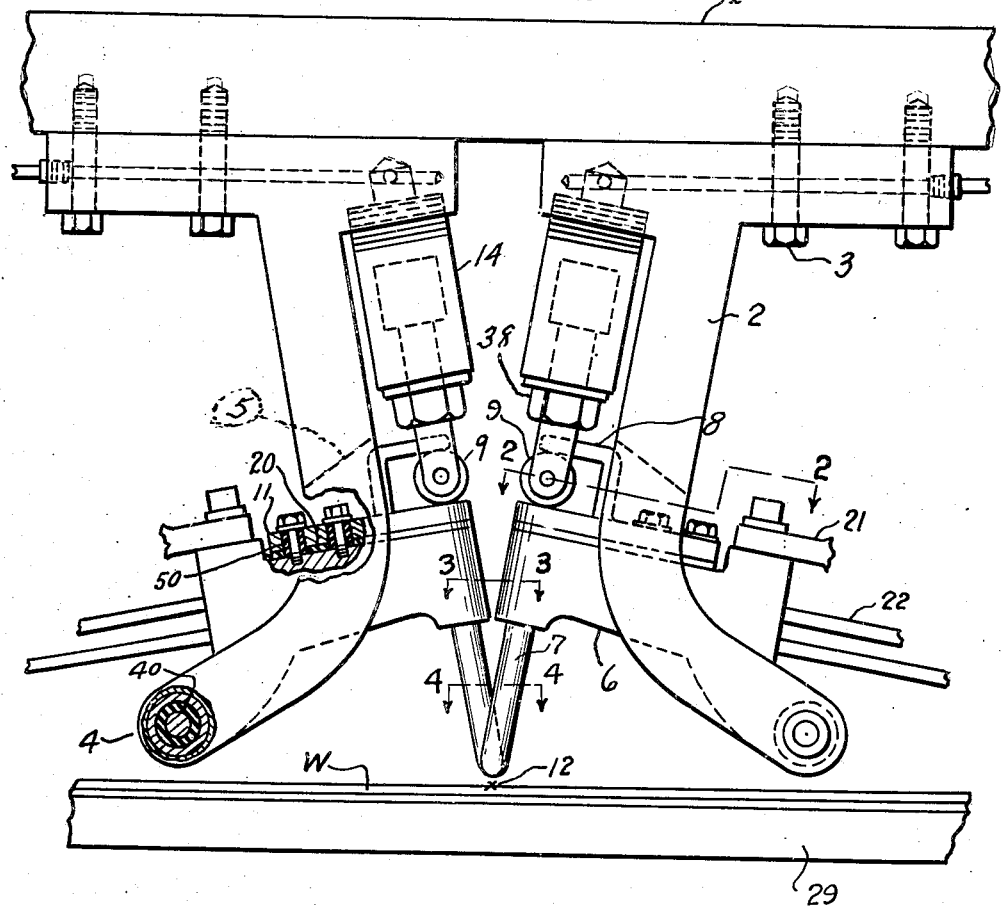
Figure 1 is an end elevation of a machine.

The electrodes are pushed toward or onto the work and withdrawn from the work by means of hydraulically or pneumatically operated pistons 13 reciprocating in cylinders 14 which are supported in the heads of the T brackets as shown in Figures 1 and 5. The operating fluid is supplied to the cylinders by means of passageways 15 and 16. The passageway 15 intersects the recess 17 in the head of the T bracket which in turn is in free communication with the upper chamber of the cylinder. The passageway 16 connects through the ports 35 and passages 18 with the lower chamber of the cylinder. Piston 13 has an enlarged portion 19 which engages the wall of the cylinder 30 and annular groove 24 houses an O ring 25 that serves as packing. An O ring 26 located in groove 28 serves as packing to seal the piston rod so as to prevent leakage of the fluid. The outer cylinder or sleeve 14 is spaced from the inner cylinder by flanges 18a and 32, and welded to spacing ring 32 at 33. The outside upper end is threaded to screw into T bracket 2 and the space between the outer and inner cylinders connects with the passageway 16 by means of ports 35 drilled in the bracket 2 from the threaded recess into which the outer cylinder screws. A slotted packing ring 37 is located between the end of the outer cylinder and the bottom of the threaded recess to seal the joint when the cylinder is screwed home by applying a wrench to the lower end 38 of the inner cylinder 30.

The work W is carried on a table 29, and the machine described and illustrated can be used as a welder in which both the upper frame 1 and the table are stationary and the necessary movement to bring the electrodes in contact with the work is afforded by the fluid operating on the pistons which in turn push the roller down and force the electrodes on the work or pull the roller upwardly and withdraw the electrodes from the work. When the pressure is turned in on the top of the piston 13, roll 9 pushes rock arm down and the electrode into contact with the work. When the pressure is turned into passageway 16 and the lower end of the cylinder, roll 9 engages the bent arm 8 to lift the rock arm 6 and the electrode 7.

The apparatus here shown may be used with a press welder such as disclosed and claimed in the Beiderman Patent 2,295,925, where the movement of the ram or bed is caused to press the work against the opposed electrodes which are backed by fluid pressure, preferably hydraulic pressure. I prefer to back the electrodes by hydraulic fluid so that the pressure on the electrodes can be equalized. It is necessary and desirable to equalize the pressure on the electrodes in order to obtain uniform welds for the reason that the character of the weld depends upon the resistance that the current meets in passing through the work and this in turn is determined in part by the pressure of the electrodes upon the work.

What I claim is:

1. Apparatus for producing a line of spot welds with a minimum of spacing between the welds, having in combination a frame provided with a plurality of supporting brackets secured to the frame and having dependent arms, the said brackets located on opposite sides of a vertical plane coinciding with the proposed line of the welds, each bracket provided with a dependent arm and a plurality of electrode supporting arms having electrically insulated tracks and pivotly supported on the bracket arms and arranged in staggered but spaced relation along the line of the spot welds on opposite sides of said vertical plane, electrodes carried by the outer free ends of the electrode supporting arms and power means having rollers for engaging the insulated tracks for swinging the electrode supporting arms down toward the work and withdrawing the electrode supporting arms from the work.

2. The combination claimed in claim 1 in which the power means for each electrode supporting arm is a cylinder, a fluid operated piston reciprocating in the cylinder and operating connections between the piston and the pivoted electrode supporting arm.

3. The combination claimed in claim 1 in which the power means for operating each electrode supporting arm comprise cylinders, fluid operated pistons in the cylinders, and operating connections with the electrode supporting arms, the cylinders and the connections located on opposite sides but in staggered positions with respect to a vertical plane coinciding with the line of welds.

4. The combination claimed in claim 1 in which the power means comprises cylinders located on opposite sides of the vertical plane coinciding with the line of welds and in upwardly inclined relation away from said plane, the cylinders being located on opposite sides of said plane in staggered relation, pistons in said cylinders and operating connections between the pistons and the electrode supporting arms for raising and lowering the electrode arms.

5. The combination claimed in claim 1 in which the power means comprises a plurality of cylinders in staggered relation on opposite sides of the vertical plane coinciding with the line of welds, a piston in each cylinder, a piston rod, a roller supported on the end of each piston rod and engaging a track on the electrode supporting arm for raising and pushing down the electrode when fluid is admitted to opposite ends of the cylinder to operate the piston.

6. The combination claimed in claim 1 in which the power means comprises a plurality of cylinders in staggered relation on opposite sides of the vertical plane coinciding with the line of welds, a piston in each cylinder, a piston rod, a roller supported on the end of the piston rod and engaging a track on the electrode supporting arm for raising and pushing down the electrode when fluid is admitted to opposite ends of the cylinder, the said track including a bent arm secured at its lower end to the top of the electrode supporting arm and engaging over the upper surface of the roller.

ERIC J. OPITZ.

REFERENCES CITED

The following references are of record in the file of this patent:

UNITED STATES PATENTS

| Number | Name | Date |
|---|---|---|
| 2,042,322 | Martin | May 26, 1936 |